US010832701B2

(12) United States Patent
Khanagha

(10) Patent No.: US 10,832,701 B2
(45) Date of Patent: *Nov. 10, 2020

(54) PITCH DETECTION ALGORITHM BASED ON PWVT OF TEAGER ENERGY OPERATOR

(71) Applicant: OmniSpeech LLC, College Park, MD (US)

(72) Inventor: Vahid Khanagha, College Park, MD (US)

(73) Assignee: OmniSpeech LLC, College Park, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/235,075

(22) Filed: Dec. 28, 2018

(65) Prior Publication Data
US 2019/0206426 A1  Jul. 4, 2019

Related U.S. Application Data

(63) Continuation of application No. 15/476,051, filed on Mar. 31, 2017, now Pat. No. 10,204,643.

(60) Provisional application No. 62/316,432, filed on Mar. 31, 2016.

(51) Int. Cl.
| G10L 25/90 | (2013.01) |
| G10L 25/18 | (2013.01) |
| G10L 15/18 | (2013.01) |
| G10L 25/06 | (2013.01) |
| G10L 15/22 | (2006.01) |

(52) U.S. Cl.
CPC .......... *G10L 25/90* (2013.01); *G10L 15/1815* (2013.01); *G10L 25/06* (2013.01); *G10L 25/18* (2013.01); *G10L 2015/223* (2013.01)

(58) Field of Classification Search
None
See application file for complete search history.

(56) References Cited

U.S. PATENT DOCUMENTS

| 6,004,017 A | 12/1999 | Madhavan |
| 7,035,744 B2* | 4/2006 | Cheriet ................ H04B 17/309 702/77 |
| 7,493,254 B2 | 2/2009 | Jung et al. |
| 8,751,220 B2 | 6/2014 | Zhang et al. |
| 8,793,128 B2 | 7/2014 | Miki |
| 8,954,324 B2 | 2/2015 | Wang et al. |
| 9,153,245 B2 | 10/2015 | Qi et al. |
| 10,204,643 B2* | 2/2019 | Khanagha ............... G10L 25/18 |
| 10,249,325 B2* | 4/2019 | Khanagha ............... G10L 25/18 |
| 10,403,307 B2* | 9/2019 | Khanagha ............... G10L 25/90 |

(Continued)

OTHER PUBLICATIONS

Rainer Martin, "Spectral Subtraction Based on Minimum Statistics", Institute for Communication Systems and Data Processing (IND), Aachen University of Technology, Published: Nov. 3, 2009, 4 pgs.

(Continued)

*Primary Examiner* — Abul K Azad
(74) *Attorney, Agent, or Firm* — Maier & Maier, PLLC

(57) ABSTRACT

A pitch detection method. Such a pitch detection method may use Teager Energy Operator (TEO) and High Passed Filter (HPF) with Pseudo Weigner Ville Transformation (PWVT) to reduce the pitch deletion errors of highly correlated types of noises in a speech signal.

20 Claims, 2 Drawing Sheets

(56) References Cited

U.S. PATENT DOCUMENTS

| | | |
|---|---|---|
| 2011/0099007 A1 | 4/2011 | Zhang |
| 2013/0335267 A1 | 12/2013 | Heo et al. |
| 2016/0259849 A1 | 9/2016 | Sinha et al. |
| 2017/0287508 A1 | 10/2017 | Khanagha |
| 2017/0287509 A1 | 10/2017 | Khanagha |

OTHER PUBLICATIONS

Patti et al.; Method for classification of nocturnal migratory bird vocalizations using Pseudo Wigner-Ville Transform; 2013 IEEE International Conference on Acoustics, Speech and Signal Processing; pp. 758-762. (Year: 2013).

Chen et al.; Pitch detection algorithm based on Teager Energy Operator and spatial Correlation function; 2007 International Conference on Machine and Cybernetics; Year 2007; vol. 5, pp. 2456-2460. (Year: 2007).

Boashash et al.; The Wigner-Ville trispectrum: definition and application; [1993 Proceedings] IEEE Signal Processing Workshop on Higher-order Statistics; pp. 260-264. (Year: 1993).

\* cited by examiner

PITCH DETECTION ALGORITHM BASED ON PWVT OF TEAGER ENERGY OPERATOR

CROSS REFERENCE TO RELATED APPLICATIONS

This application is a continuation of U.S. patent application Ser. No. 15/476,051, filed Mar. 31, 2017, which claims priority from U.S. Provisional Patent Application Ser. No. 62/316,432, filed Mar. 31, 2016, the entire contents of which are hereby incorporated by reference.

BACKGROUND

There are two general categories of pitch detection algorithms. Time domain algorithms rely on the periodic shape of speech waveforms over time and use different measures of periodicity such as the autocorrelation function or Average Magnitude Difference Function (AMDF) to evaluate the periodicity of the waveform. These methods are often computationally expensive and are also prone to insertion errors when dealing with correlated types of noise, as they cannot discriminate between tonal periodicity of a correlated noise and the rich harmonically structured periodicity of speech. Frequency domain methods, however, are based on direct evaluation of the existence of speech harmonic frequency structure, using one of the many available spectral representation techniques, such as short term Fourier transform, wavelet transform, Cepstrum and others. The success of the frequency domain methods depend on their ability to resolve frequency components of the speech, especially in the presence of noise. The latter usually requires a relatively large analysis window (as large as 100 msec), which is not suitable for real-time applications that require the lowest possible processing delay. Moreover, a large analysis window compromises the time resolution of the pitch estimates.

Using a time domain energy operator, called the Teager Energy Operator (TEO) with Pseudo Weigner Ville Transformation (PWVT) is very helpful to recover speech from noise and to recover low-frequency information of the speech signal in detecting human pitch from noisy speech recordings where the noise contains strong and stable low-frequency activity or when the recording conditions have caused a loss in low-frequency content of the speech signal. Such a PWVT-TEO algorithm relies on the information contained in the frequency range below 1 kHz. The algorithm performs well for most of the noise cases, but it may fail in dealing with the special case of noises that corrupt the frequency range that the algorithm relies on, even if the speech information is preserved neatly in the higher frequency ranges.

SUMMARY

According to at least one exemplary embodiment, a pitch detection method may be described. Such a pitch detection method may provide a solution for highly correlated types of noises by significantly reducing the insertion errors when in PWVT-TEO mode. Also, such a method may handle speech recordings whose low frequency content is completely corrupted by noise.

Such a pitch detection method may include: sampling a signal to generate a first discrete time signal; applying Teager Energy Operator (TEO) to the first discrete time signal to generate a second discrete time signal; high-pass filtering the first discrete time signal to generate a high-pass filtered discrete time signal; applying TEO to the high-pass filtered discrete time signal to generate a third discrete time signal; generating a first complex valued signal from the first discrete time signal; generating a second complex valued signal from the second discrete time signal; generating a third complex valued signal from the third discrete time signal; computing a Pseudo Weigner Ville Transformation (PWVT) on the first complex valued signal to generate a first spectral representation of the signal; computing a PWVT on the second complex valued signal to generate a second spectral representation of the signal; computing a PWVT on the third complex valued signal to generate a high-pass filtered spectral representation of the signal; generating a combined spectral representation from the first spectral representation and the second spectral representation; computing, to generate a pitch candidate, a harmonic summation on at least one of the combined spectral representation, the first spectral representation, and high-pass filtered spectral representation; and deciding the pitch candidate as a pitch value if the corresponding harmonic summation value is larger than a threshold.

In another embodiment, the pitch detection method may further include: applying a Hilbert Transform to the first discrete time signal to generate the first complex valued signal; applying a Hilbert Transform to the second discrete time signal to generate the second complex valued signal; and applying a Hilbert Transform to the third discrete time signal to generate the third complex valued signal, wherein each of the first complex valued signal, the second complex valued signal and the third complex valued signal is low-pass filtered and buffered to generate an analysis window.

In another embodiment, the PWVT is computed by a 512 point Discrete Fast Fourier Transform (DFFT) as a frequency domain representation of the signal in the range of 0 to 1 Khz. Also, when generating the combined spectral representation, the low-frequency part of the combined spectral representation is taken from the second spectral representation and a remaining part of the combined spectral representation is taken from the first spectral representation. Additionally, when computing the harmonic summation, the harmonic summation is computed on the combined spectral representation if an amount of the low-frequency energy of the signal is larger than a pre-determined threshold that represents the low-frequency corruption of the signal, and the harmonic summation is computed within the human pitch frequency range.

In another embodiment, when deciding the pitch candidate as the pitch value, the pitch candidate is taken as the location of the peak of the harmonic summation, if the value of this peak is higher than fifty times the median value of the selected spectral representation or the average value of harmonic summation values taken over more than one hundred frames of the signal in which the pitch value is not detected.

In another embodiment, when deciding the pitch candidate as the pitch value, the threshold is at least one of the median value and an average value of more than one hundred frames of the signal in which no pitch value is detected, and the average value is updated in each frame of the speech signal, and, when computing the harmonic summation, the harmonic summation is computed on the high-pass filtered spectral representation if an amount of a low frequency noise energy of the signal is larger than 5 times of a remaining frequency noise energy of the signal. Also, to obtain the low frequency noise energy and the remaining frequency noise energy, the Rainer Martin (RM) algorithm is applied.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
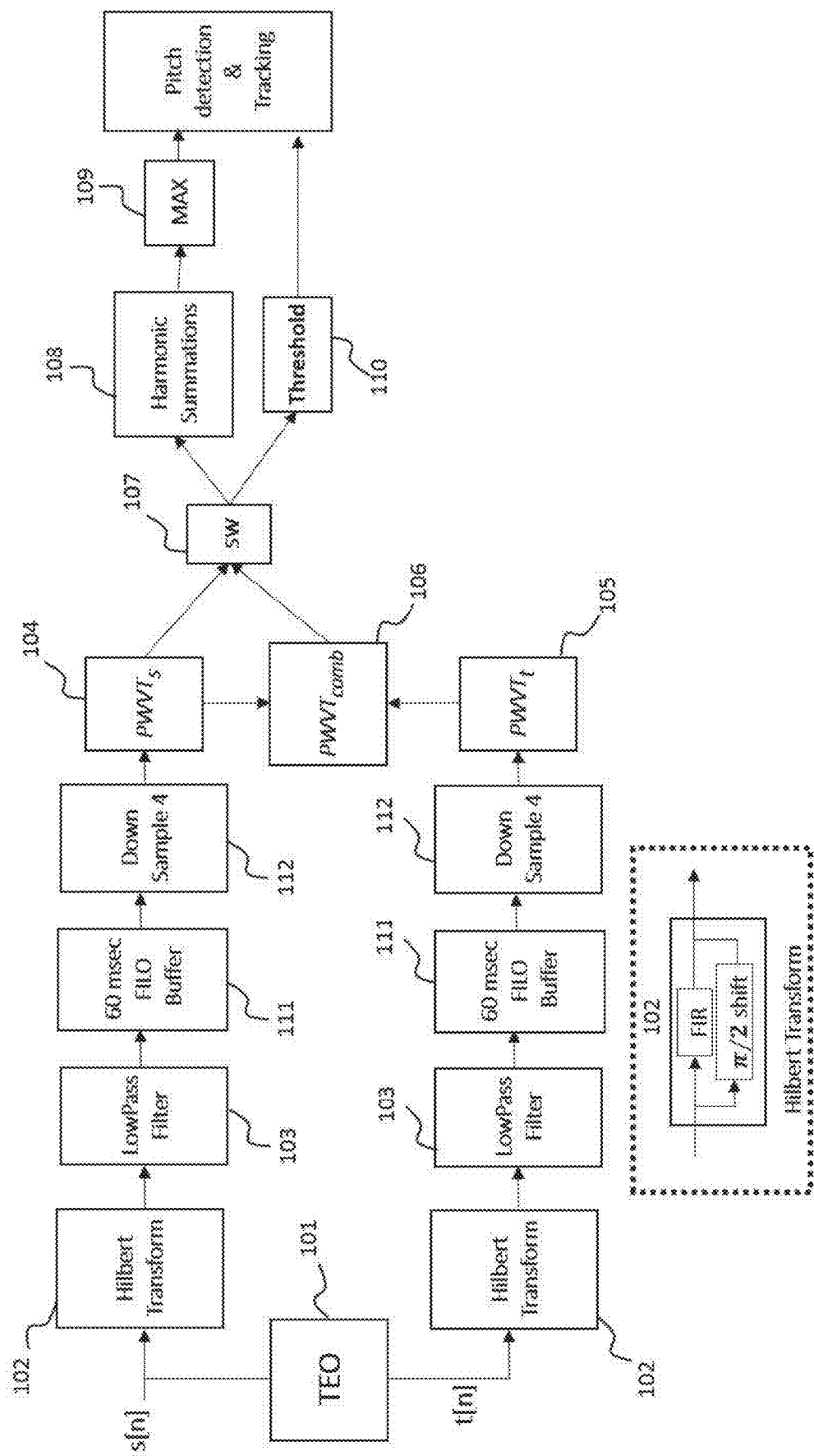
FIG. 1 is an exemplary block diagram of a pitch detection algorithm according to an exemplary embodiment.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to an exemplary embodiment, and referring to the Figures generally, a pitch detection method may be provided. According to one exemplary embodiment, the pitch detection method may provide a solution for highly correlated types of noises by significantly reducing the insertion errors when in PWVT-TEO mode. Also, such a method may handle speech recordings whose information content below 1000 Hz is completely corrupted by noise when in $PWVT_{HPF}$ mode. Accordingly, pitch deletion error can be significantly reduced.

One of the challenges in detection of human pitch from noisy speech recordings is to cope with correlated types of noises, such as car engine noise, that contain strong and stable low-frequency activity. In such a case, the noise waveform has a periodic shape and thus it is difficult to distinguish them from periodic voiced segments of the speech signal. Another challenge in detecting the pitch is when the recording has lost their low-frequency information due to various reasons, such as imperfect recording conditions, telephony microphone filtering (a high-pass filtering effect with cut-off frequency around few hundreds of Hz) and the like.

To overcome these challenges, it is noted that the majority of voiced speech segments exhibit an impulsive type of periodicity (waveform looks like an exponentially weighted sinusoid) rather than a tonal type of periodicity (waveform looks like a sinusoid). This impulsive type of periodicity results in vertical striations in a wide-band spectrogram. The correlated types of noises, however, show a tonal type of periodicity and they sometimes are very similar to a pure sinusoid. Accordingly, this difference in the type of periodicity can be used to distinguish a correlated noise and voiced speech. The same concept can help to recover the weakened low-frequency content of high-passed filtered speech. Indeed, for high-pass filtered voiced speech, the periodic impulse train still exists, but it has little or no energy at frequencies below a few hundred Hz. However, as the impulses still show stable frequency activity around all the remaining frequency bands, once detected, they can be used to recover the weakened low-frequency information.

Turning now to exemplary FIG. 1, FIG. 1 shows an exemplary block diagram of a pitch detection algorithm. According to an exemplary embodiment, to benefit from the above-mentioned spectral properties, the Teager Energy Operator (TEO) 101 is applied. TEO 101 acts as a non-linear filter: if applied to a tonal periodic waveform such as correlated noise, it returns a constant value and when applied to a high-pass filtered impulsive waveform, it recovers the low-frequency content. The TEO 101 applied to the discrete-time signal (s[n]) is defined as:

$$t[n]=s^2[n]-s[n-1]s[n+1] \qquad \text{Equation 1}$$

Once the TEO is applied to the speech signal, the low-frequency spectral shape will be enhanced as explained above. But the higher frequencies sometimes show distorted behavior. To solve this problem, a combinatory approach may be employed in an exemplary embodiment as follows.

Referring still to FIG. 1, the discrete time speech signal (s[n]) may be sampled at 8 KHz and fed to the pitch detection algorithm as 10 msec frames (80 samples at 8 KHz) and the TEO 101 is computed to obtain t[n]. As the Pseudo Weigner Ville Transformation (PWVT) operates on complex input signals, for both t[n] and s[n], at first, a Hilbert Transform 102 is applied to the signal. The Hilbert transform 102 is implemented in the time-domain using a half band Finite-Impulse-Response (FIR) filter. The output of the FIR filter forms the real part and the shifted version of speech signal (equal to $\pi/2$) forms the imaginary part. Consequently, the resulting complex values are low-pass filtered by an anti-aliasing low-pass filter 103 with cut-off frequency of 1 KHz, and then buffered to form an analysis window of 60 msec length (e.g. reference number 111 of FIG. 1). Consequently, after down-sampling the analysis window by a factor of 4 (e.g. the reference number 112 of FIG. 1), the PWVT 104 is computed.

According to an exemplary embodiment, the PWVT may be computed by taking the Discrete Fast Fourier Transform (DFFT) of the following discrete time correlation summation:

$$w_s[m] = \sum_{k=-256}^{256} g[k]s[k+m]s^*[k-m], \quad \text{Equation 2}$$
$$m = -255: 254$$

$$w_t[m] = \sum_{k=-256}^{256} g[k]t[k+m]t^*[k-m], \quad \text{Equation 3}$$
$$m = -255: 254$$

where g is a Gaussian smoothing window, m denotes time index and k denotes frequency index. $w_s[m]$ and $w_t[m]$ are then multiplied by another Gaussian window before computation of the 512 point DFFT to obtain the PWVT transform for both branches: $PWVT_s$ 104 is obtained from the signal itself and $PWVT_t$ 105 is obtained from the TEO 101. Both $PWVT_s$ 104 and $PWVT_t$ 105 provide a 512 point representation of the first 1 KHz frequency content of the signal over time. As $PWVT_t$ 105 provides an enhanced representation for lower frequencies and $PWVT_s$ 104 provides a clearer representation for the higher frequencies (above 250 Hz), according to an exemplary embodiment, the first 125 points are taken from $PWVT_t$ 105 and the remaining are taken from $PWVT_s$ 104 to form a combined representation $PWVT_{comb}$ 106.

Although $PWVT_{comb}$ 106 provides an overall enhanced representation for noisy speech, using only the representation computed from the raw speech signal ($PWVT_s$ 104) may still be appropriate when the signal is clean, or when there is no low-frequency corruption. This provides computational efficiency (when $PWVT_t$ is not computed at all) as well as precision for the rare cases where the TEO 101 filters out some of the voiced frames. For this reason, in an exemplary embodiment, a state machine (shown as SW 107 in FIG. 1) may be implemented to decide which PWVT is to be used between $PWVT_{comb}$ 106 or $PWVT_s$ 104. According to an exemplary embodiment, the algorithm starts in the state where it uses $PWVT_{comb}$ 106. Then, for every ten frames, the relative amount of the low-frequency energy may be computed as:

$$R_e = \frac{\sum_{k=30}^{110} PWVT_s}{\sum_{k=30}^{110} PWVT_{comb}} \quad \text{Equation 4}$$

According to an exemplary embodiment, if it happens more than ten times that $R_e \cong 1$, the state is switched to the mode where the $PWVT_s$ 104 is only used. Afterwards, if it happens more than ten frames that $R_e < 0.2$, the state is switched back to the mode that $PWVT_{comb}$ 106 is used.

Once it is decided which PWVT is to be used, by using the absolute value of this representation, the existence of harmonics can be checked as they appear during the voiced parts of the speech signal. To do this, the harmonic summations 108 of the PWVT [m,k] may be computed as:

$$HS[m, k] = \sum_{q=1}^{N_q} PWVT[m, qk] - \sum_{q=1}^{N_q} PWVT[m, (q+0.5)k] \quad \text{Equation 5}$$

According to an exemplary embodiment, HS [m,k] is being computed only in the frequency range that corresponds to the range of human pitch frequency (60 Hz to 400 Hz). If a given analysis window contains voiced speech with a pitch frequency corresponding to frequency bin $k_0$, PWVT [m,k] will show prominent peaks at integer multiplies of $k_0$ with valleys located between adjacent peaks. Consequently, HS[m,k] is expected to generate prominent maxima at the bin $k_0$. Thus, the location of the maximum of HS[m,k]($k_{max}$) may be taken as a candidate pitch (e.g. reference number 109 of FIG. 1). If a processed frame belongs to a voiced segment of the speech signal, HS[m,$k_{max}$] should attain a very high value. Accordingly, in an exemplary embodiment, a threshold can be applied to decide whether the computed value is high enough to decide whether the current frame is a voiced one or not. According to an exemplary embodiment, to reduce the sensitivity of the algorithm to input signal power variations, a soft threshold may be used to make the final decision (instead of a fixed hard threshold that is vulnerable to input level variations). To do so, the median value of PWVT[m,k] is taken as the noise floor level ($N_f$) (e.g. the reference number 110 of FIG. 1) and then if HS[m,$k_{max}$] is larger than 50 times the noise floor, the frame being processed is considered a voiced frame and $K_{max}$ is taken the frequency index of the corresponding pitch frequency. Such decision logic may detect higher pitch frequencies for which the harmonic distance is relatively high and thus median value of the PWVT[m,$k_{max}$] provides a good estimate of the noise floor.

However, for the voiced speech with lower pitch value, the harmonic lines can be so close that they overlap and the median value is too large to be considered as a threshold. According to another exemplary embodiment, to avoid such a challenge, a second criterion may be used in making the voicing decision based on a second threshold, which is the moving average of PWVT[m,$k_{max}$] over the non-speech frames. According to another exemplary embodiment, this second decision criteria is based on a feedback from the first criteria and updates the moving average value, only at the frames that are not considered as voiced frames. More specifically, at the initialization time, only the first criteria is applied and for the frames that are not taken as voiced, the moving average is being updated ($MA_{PWVT_{noise}}$). According to another exemplary embodiment, after one hundred updates, the second criterion may be started to be considered as a threshold and the frame may be taken as voiced if either of the two criteria are met, (for example, PWVT[m,$k_{max}$] >$50N_f$ or PWVT [m,$k_{max}$]>$2MA_{PWVT_{noise}}$). As the analysis window is 60 msec long, the computed pitch value belongs to the central frame and as such, the algorithm has 30 msec of inherent latency (delay in computation of the pitch value for each new frame).

As described above, the PWVT-TEO algorithm of FIG. 1 relies on the information contained in the frequency range below 1 kHz. The PWVT-TEO algorithm performs well for most of the noise cases, but it can have a technical problem for the special case of noises that corrupt the frequency range that the algorithm relies on, even if the speech information is preserved neatly in the higher frequency ranges. Accordingly, to provide a technical solution to the problem, in another exemplary embodiment, approaching a third level of combination with using the TEO applied to the High Passed Filter (HPF) version of the signal may be applied to recover the information about the speech signal that is preserved in higher frequencies.

Figure 2:
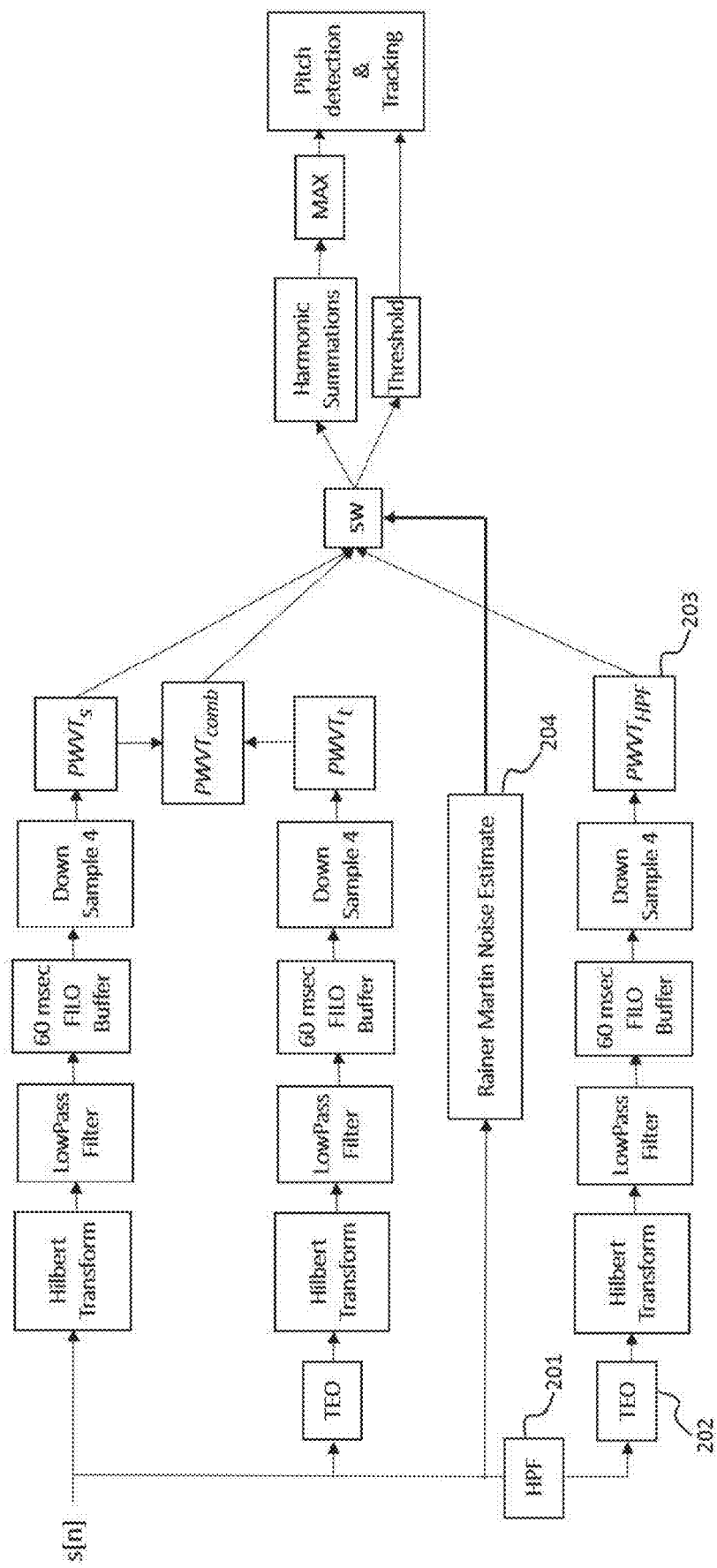
FIG. 2 is an exemplary block diagram of a pitch detection algorithm where high-pass filtered signal is applied to TEO according to another exemplary embodiment.

Turning now to exemplary FIG. 2, FIG. 2 shows a block diagram of a pitch detection algorithm where TEO is applied to the high-pass filtered signal to recover speech from a strong noise in the frequency range below 1000 Hz. As shown in FIG. 2, the first two branches of the algorithm are the same as the PWVT-TEO algorithm in FIG. 1. The PWVT-TEO algorithm of FIG. 1 may handle the case where the signal is completely corrupted by noise in the frequency range below 1000 Hz, but there is information left about the speech signal in the range above 1000 Hz. Indeed, the majority of voiced speech segments exhibit an impulsive type of periodicity and their waveform resembles a train of smoothened impulses. These impulses exhibit a flat frequency activity across all frequencies (sometimes up to 4000 Hz).

According to another exemplary embodiment, the concept of the Teager Energy Operator (TEO) may also be applied to take advantage of the remaining information in the higher frequencies. As described above, TEO acts as a non-linear filter; if applied to a tonal periodic waveform such as correlated noise, it returns a constant value and when applied to a high-pass filtered 201 impulsive waveform, it recovers the low-frequency content. Also, in another exemplary embodiment, the TEO applied to the discrete-time signal (s[n]) is defined as the same as the Equation 1 of FIG. 1.

In an exemplary embodiment, to reduce the effect of noise, a High Pass Filter (HPF) with a cut-off frequency of 1000 Hz is applied to the signal (s[n]) before TEO 202 is applied to recover the low frequency impulsive behavior of voiced speech. Indeed, in places where there remains a strong impulse in the frequency range above 1 KHz, the TEO recovers the impulsive behavior in the first 1 KHz. Consequently, the PWVT-based algorithm can be used to detect the pitch value (the resulting PWVT may be called as $PWVT_{HPF}$ 203).

The above-mentioned procedure may significantly improve the performance of pitch detection for the above-mentioned types of noises. However, for other noise cases, the PWVT-TEO of FIG. 1 may provide superior performance. Thus, according to another exemplary embodiment, the PWVT-TEO of FIG. 1 is used except the case that the first 1 KHz of the signal is completely corrupted. To do so, a decision mechanism is applied to switch between two versions of PWVT: $PWVT_{HPF}$ 203 and $PWVT_{comb}$. This may be done through the use of the Rainer Martin (RM) algorithm 204 that provides an estimate of the minimum noise floor at different frequencies. According to an exemplary embodiment, a 256-point DTFFT is computed and the RM is applied to provide minimum noise estimates of the past 1 second of the speech. If the noise energy in the first 1 KHz was significantly (for example 5 times) higher than the noise energy in the remaining 3 KHz, the state is switched to use the $PWVT_{HPF}$. Otherwise, the normal operation of the PWVT-TEO will be continued, as described above with FIG. 1.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for a pitch detection comprising:
   at least one memory configured to operatively coupled to at least one computing system; and
   the at least one computing system configured to:
   sample a signal to generate a first discrete time signal;
   apply Teager Energy Operator (TEO) to the first discrete time signal to generate a second discrete time signal;
   high-pass filter the first discrete time signal to generate a high-pass filtered discrete time signal;
   apply TEO to the high-pass filtered discrete time signal to generate a third discrete time signal;
   generate a first complex valued signal from the first discrete time signal;
   generate a second complex valued signal from the second discrete time signal;
   generate a third complex valued signal from the third discrete time signal;
   compute a Pseudo Weigner Ville Transformation (PWVT) on the first complex valued signal to generate a first spectral representation of the signal;
   compute a PWVT on the second complex valued signal to generate a second spectral representation of the signal;
   compute a PWVT on the third complex valued signal to generate a high-pass filtered spectral representation of the signal;
   generate a combined spectral representation from the first spectral representation and the second spectral representation;
   compute, to generate a pitch candidate, a harmonic summation on at least one of the combined spectral representation, the first spectral representation and high-pass filtered spectral representation; and
   decide the pitch candidate as a pitch value if a harmonic summation value of the pitch candidate is larger than a threshold.

2. The system of claim 1, wherein the at least one computing system is further configured to:
   apply a Hilbert Transform to the first discrete time signal to generate the first complex valued signal;
   apply a Hilbert Transform to the second discrete time signal to generate the second complex valued signal; and
   apply a Hilbert Transform to the third discrete time signal to generate the third complex valued signal,
   wherein each of the first complex valued signal, the second complex valued signal and the third complex valued signal is low-pass filtered, buffered and down-sampled.

3. The system of claim 1, wherein the TEO is used as a non-linear filter that recovers low-frequency content of a human speech signal from a high-pass filtered waveform of the human speech signal, while removing tonal periodic noisy components.

4. The system of claim 1, wherein the PWVT is computed by Fourier Transform to represent a frequency content of the signal over time.

5. The system of claim 1, wherein the PWVT is computed by 512 points Discrete Fast Fourier Transform (DFFT) to represent a frequency content of the signal over time with a frequency range that is less than 1 KHz.

6. The system of claim 1, wherein when the combined spectral representation is generated by the at least one computing system, a low-frequency part of the combined spectral representation are taken from the second spectral representation and a remaining part of the combined spectral representation are taken from the first spectral representation.

7. The system of claim 1, wherein the harmonic summation is computed on the combined spectral representation if a relative amount of a low-frequency energy of the signal is larger than a pre-determined threshold.

8. The system of claim 1, wherein the harmonic summation is computed within a human pitch frequency range.

9. The system of claim 1, wherein the pitch candidate is a frequency location of a maximum value of the harmonic summation.

10. The system of claim 1, wherein the threshold is fifty times of a median value of at least one of the combined spectral representation, the first spectral representation and the high-pass filtered spectral representation.

11. The system of claim 1, wherein when the signal is sampled by the at least one computing system, the signal is each frame of a speech signal.

12. The system of claim 10, wherein the speech signal is sampled at 8 KHz as 10 msec frame.

13. The system of claim 10, wherein the threshold is a smaller value between the median value and an average value of harmonic summation values taken over more than one hundred frames of the signal in which the pitch value is not detected.

14. The system of claim 2, wherein when Hilbert Transform is applied by the at least one computing system, a half band Finite-Impulse-Response (FIR) filter is applied for a real part, and a shift in an amount of $\pi/2$ is applied for an imaginary part.

15. The system of claim 2, wherein an anti-aliasing low-pass filter with cut-off frequency of 1 KHz is applied to low-pass filter each of the first complex valued signal, the second complex valued signal and the third complex valued signal.

16. The system of claim 2, wherein each of the first complex valued signal, the second complex valued signal and the third complex valued signal is buffered to form the analysis window with 60 msec length.

17. The system of claim 2, wherein each of the first complex valued signal, the second complex valued signal and the third complex valued signal is down sampled by a factor 4.

18. The system of claim 1, wherein when the first discrete time signal is high-pass filtered by the at least one computing system, a High Pass Filter (HPF) with a cut-off frequency of 1000 Hz is applied to the first discrete time signal.

19. The system of claim 1, wherein the harmonic summation is computed on the high-pass filtered spectral representation if a low frequency noise energy of the signal is larger than a remaining high frequency noise energy of the signal.

20. The system of claim 1, wherein the harmonic summation is computed on the high-pass filtered spectral representation if a first frequency noise energy of the signal is larger than 5 times of a second frequency noise energy of the signal, and the first frequency noise energy is a noise energy of a first 1 kHz and the second frequency noise energy is the noise energy of a remaining 3 kHz.

* * * * *